Feb. 7, 1933.     T. P. WRIGHT     1,896,270

AIRPLANE

Filed Sept. 6, 1929

INVENTOR
THEODORE P. WRIGHT
BY
ATTORNEY

Patented Feb. 7, 1933

1,896,270

UNITED STATES PATENT OFFICE

THEODORE P. WRIGHT, OF PORT WASHINGTON, NEW YORK, ASSIGNOR TO CURTISS AEROPLANE & MOTOR COMPANY, INC., A CORPORATION OF NEW YORK

AIRPLANE

Application filed September 6, 1929. Serial No. 390,668.

My invention relates to airplanes and more particularly to airplanes of the type in which only one motor is used for producing the thrust necessary for flight.

Prior to my invention there have been many single motored airplanes but usually such airplanes have been of the type in which the motor is positioned in the nose of the fuselage. There have also been airplanes of the multiple motor type in which motors have been placed on the wings or at other points at the sides of the fuselage.

One object of my invention is the provision of increased visibility in airplanes of the single motored type.

A further object is the arrangement of the parts of such an airplane in a way that it is possible to provide a practical airplane of the pusher type using only a single motor.

A further object is the reduction of fuselage vibration in airplanes of the above described type.

A further object is the reduction of the effect of motor fumes upon the occupants of an airplane of the above described type.

A further object is the reduction of the hazards of crash in airplanes of said type. This is accomplished by reducing the fire hazard and also by reducing the hazard of the weight of the engine falling upon the occupants of the airplane or vice versa.

Further objects will be apparent from a reading of the subjoined specification and claims and from a consideration of the drawing.

In order to explain the invention more clearly, one embodiment thereof is shown in the accompanying drawing, in which.

In general, the airplane selected for illustration of my invention is different from the usual airplane now in use in that one wing is larger than the other wing, being longer and also being thicker. The single motor is mounted on brackets on the larger wing and the weight thereof is counterbalanced by the increased lift of the larger wing. The offset thrust of the motor is counterbalanced by the increased drag of the thicker wing and, if desired, by a suitably cambered vertical fin.

Figure 1:
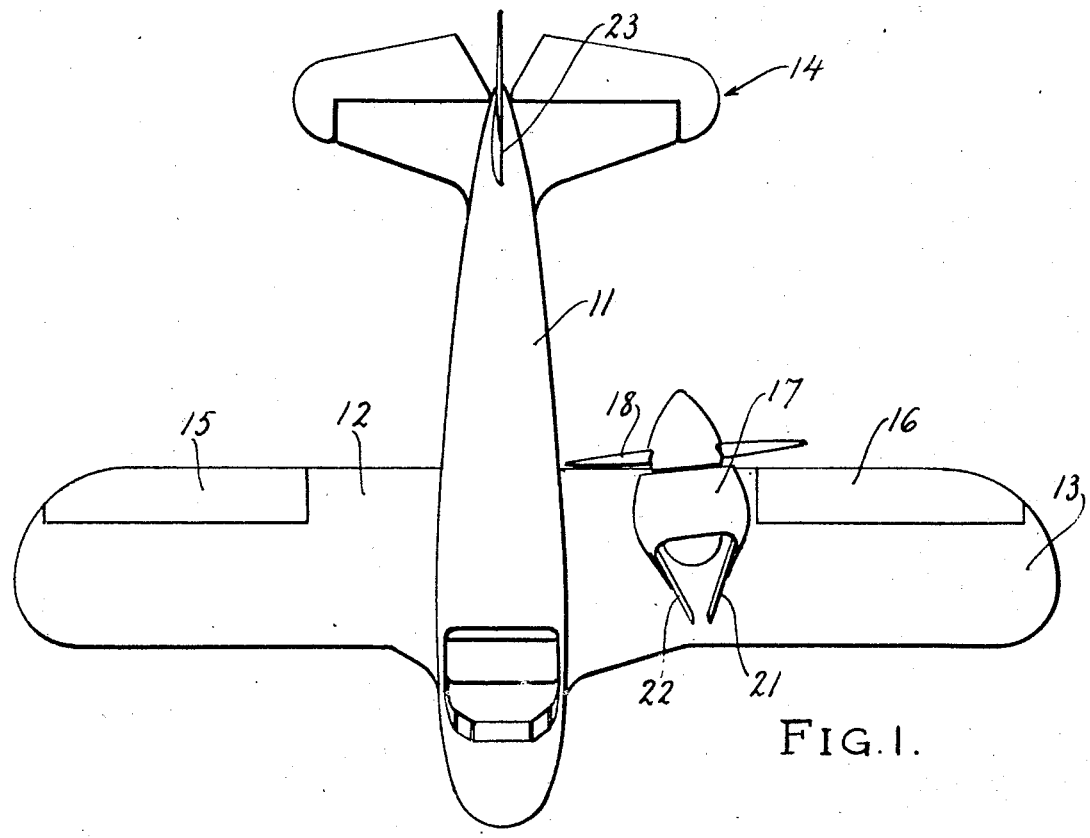
Fig. 1 is a plan view of one form of airplane constructed according to my invention.
Figure 2:
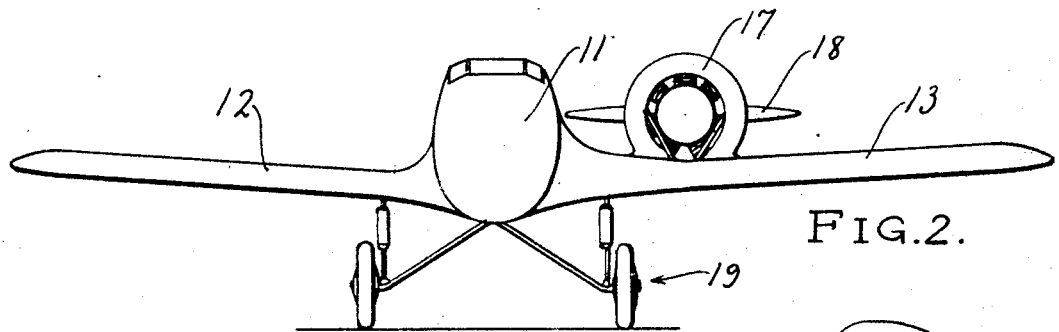
Fig. 2 is a front elevation of the airplane shown in Fig. 1.
Figure 3:
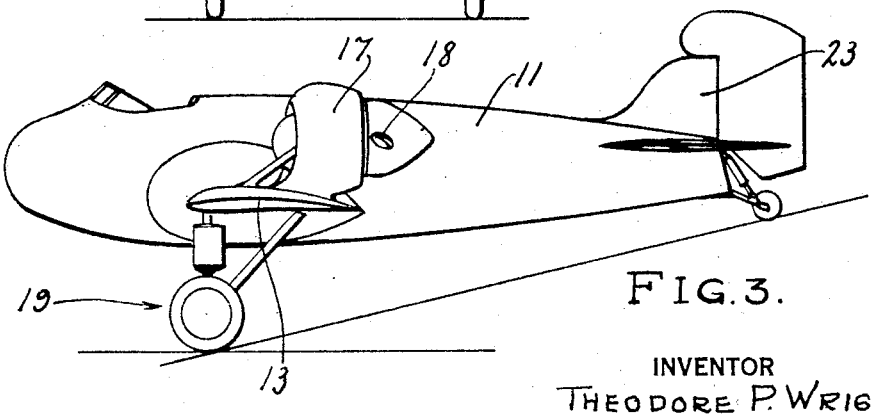
Fig. 3 is a side elevation of the airplane shown in Figs. 1 and 2.

Referring particularly to the drawing, the airplane is shown as comprising a fuselage 11, wings 12 and 13, tail surfaces generally designated as 14, ailerons 15 and 16, a motor 17 carrying a propeller 18, and a landing gear generally designated 19. The wing 13 is longer than the wing 12 and as shown more clearly in Fig. 2 is thicker than wing 12. The motor 17 may be mounted on brackets 21 and 22 on the wing 13 and may be, if desired, suitably inclined with reference to the longitudinal axis of the fuselage. Included in the tail surfaces 14 is a vertical fin 23 which may be cambered either to the right or left to a suitable degree to counterbalance the difference between the offset thrust of the motor 17 and the excess drag of the thicker and longer wing on the motor side.

It is thought that the operation of my improved airplane will be readily understood from the above description. The motor 17 operates the propeller 18 to push the airplane through the air and the wings 12 and 13 being so driven, lift the airplane into the air. The increased weight of the motor 17 is counterbalanced by the larger lift of the larger wing 13, and the turning movement, which might be caused by the offset position of the thrust, is counterbalanced by the increased drag of the larger wing 13 and by the camber of the vertical fin 23.

It is to be understood that the above described embodiment of my invention is for the purpose of illustration only and various changes may be made therein without departing from the spirit and scope of my invention.

I claim as my invention:

1. An airplane comprising, a fuselage, a supporting wing on each side of the fuselage, one of said wings being subject to greater drag than the other wing, means for exerting a thrust to propel the airplane forward, the thrust being so positioned that in combination with said unbalanced drag, there is a tendency for the airplane to yaw, and a vertical fin having a greater camber on one side than on the other for offsetting said yawing tendency and for maintaining the normal forward course of the airplane substantially parallel with the longitudinal axis of the fuselage.

2. An airplane comprising, a fuselage, a single propeller mounted on said airplane in offset relation to the longitudinal axis of said fuselage, a motor for said propeller, and a vertical fin disposed at the longitudinal axis of said fuselage and having a greater camber on one side than on the other for compensating for part of the offset thrust.

3. Means for increasing the visibility in airplanes having a fuselage comprising a single thrust means for propelling said airplane offset from the longitudinal axis of the fuselage, and a vertical fin disposed at the longitudinal axis of the fuselage and having a greater camber on one side than on the other for compensating for part of the offset thrust.

4. An airplane comprising, a fuselage, a supporting wing on each side of the fuselage, one of said wings having a greater supporting surface and being subject to greater drag than the other wing, means for exerting a thrust to propel the airplane mounted upon said last mentioned wing in offset relation to the longitudinal axis of said fuselage, and means cooperating with the drag of said last mentioned wing for compensating for the offset thrust.

In testimony whereof I hereunto affix my signature.

THEODORE P. WRIGHT.